US009477720B1

(12) United States Patent

Gyongyi et al.

(10) Patent No.: US 9,477,720 B1

(45) Date of Patent: Oct. 25, 2016

(54) SOCIAL SEARCH ENDORSEMENTS

(75) Inventors: Zoltan I. Gyongyi, Menlo Park, CA (US); Matthew E. Kulick, San Francisco, CA (US); Mikhail Lopyrev, San Francisco, CA (US); Viswanath Subramanian, San Jose, CA (US)

(73) Assignee: Google Inc., Mountain View, CA (US)

( * ) Notice: Subject to any disclaimer, the term of this patent is extended or adjusted under 35 U.S.C. 154(b) by 532 days.

(21) Appl. No.: 13/620,796

(22) Filed: Sep. 15, 2012

Related U.S. Application Data

(63) Continuation of application No. 13/294,376, filed on Nov. 11, 2011.

(51) Int. Cl.
*G06F 17/30* (2006.01)

(52) U.S. Cl.
CPC ............................... *G06F 17/30554* (2013.01)

(58) Field of Classification Search
CPC ......................... G06Q 50/00; G06F 17/30554
USPC ....... 707/706, 713, 722, 736, 737, 741, 752, 707/754–758, 999.003–999.006
See application file for complete search history.

(56) References Cited

U.S. PATENT DOCUMENTS

| | | | | |
|---|---|---|---|---|
| 2006/0004713 | A1 | 1/2006 | Korte et al. | |
| 2006/0136377 | A1 | 6/2006 | Patt-Shamir et al. | |
| 2007/0203887 | A1 | 8/2007 | Dynin | |
| 2009/0164929 | A1* | 6/2009 | Chen et al. | 715/769 |
| 2009/0299824 | A1* | 12/2009 | Barnes, Jr. | 705/10 |
| 2011/0131106 | A1* | 6/2011 | Eberstadt et al. | 705/26.1 |
| 2011/0153599 | A1 | 6/2011 | Hillis et al. | |
| 2011/0196923 | A1* | 8/2011 | Marcucci et al. | 709/204 |
| 2012/0072427 | A1 | 3/2012 | Smyth et al. | |
| 2012/0210247 | A1 | 8/2012 | Khouri et al. | |
| 2013/0085804 | A1* | 4/2013 | Leff et al. | 705/7.29 |
| 2013/0097144 | A1* | 4/2013 | Siamwalla et al. | 707/706 |

* cited by examiner

*Primary Examiner* — Syling Yen

(74) *Attorney, Agent, or Firm* — Fish & Richardson P.C.

(57) ABSTRACT

This specification describes technologies relating to searching. In general, aspects of the subject matter described in this specification can be embodied in methods that include the actions of receiving, at a computing device, a search query from a user, receiving, at the computing device, search results responsive to the search query, the search results each associated with digital content stored in one or more computer-readable storage media, determining that a first search result of the search results is associated with a first endorsement generated by a first user, determining that the first user is a member of a social graph of the user, and transmitting instructions to display the search results to the user, the instructions including instructions to display a first endorsement annotation associated with the first search result.

16 Claims, 6 Drawing Sheets

404b
Jane Friend
I'm still alive and am fine! << Tanzania 2006 by Jane Friend
I was on safari, to the Serengeti and the Ngorongoro. I left Tuesday - Intere
actually: I had been talking to several safari companies about the ...
noelliejt.wordpress.com/2006/08/06/im-still-alive-and-am-fine/ - 34k -
Cached - Similar pages - Note this 404c
John Smith
Youtube - Africa Safari in Tanzania and Kenya
On June 2007 I visited Tanzania and Kenya.. I did some sa
4 min 19 sec - ☆☆☆☆☆
www.youtube.com/watch?v=XQ0RZyGSTUs 404d
Bob Smith
Tanzania Safari - Lioness on Flickr - Photo Sharing! by Bob
The copy young lady is one of my favourites, but I didn't get anywhere near
charming she looked.
www.flickr.com/photos/harold_stern/21448122/ - 79k -
Cached - Similar pages - Note this

FIG. 4 (Cont.)

SOCIAL SEARCH ENDORSEMENTS

CROSS-REFERENCE TO PRIOR APPLICATION

This is application is a continuation of U.S. patent application Ser. No. 13/294,376, filed Nov. 11, 2011 and entitled "Social Search Endorsements," the subject matter of which is incorporated herein by reference in its entirety.

BACKGROUND

The present disclosure relates to searching.

Search engines aim to identify resources (e.g., images, audio, video, web pages, text, documents) that are relevant to a user's needs and to present information about the resources in a manner that is most useful to the user. Search engines return a set of search results in response to a user submitted text query. For example, in response to an image search text query, the search engine returns a set of search results identifying resources responsive to the query.

A large number of search results can be returned for a given query. Consequently, it can be difficult for a searching user to choose a result that is most relevant to the searching user or that provides advice that the searching user is comfortable relying upon. A searching user may give more weight to search results that are associated with reviews, opinions, or other content associated with the searching user's social graph (e.g., contacts of the user) and/or other users of interest to the searching user. However, these search results can be clouded by content associated with other users not of interest to the searching user or not associated with users at all.

SUMMARY

This specification describes technologies relating to searching.

In general, one aspect of the subject matter described in this specification can be embodied in methods that include the actions of receiving, at a computing device, a search query from a user, receiving, at the computing device, search results responsive to the search query, the search results each associated with digital content stored in one or more computer-readable storage media, determining that a first search result of the search results is associated with a first endorsement generated by a first user, determining that the first user is a member of a social graph of the user, and transmitting instructions to display the search results to the user, the instructions including instructions to display a first endorsement annotation associated with the first search result. Other embodiments of this aspect include corresponding systems, apparatus, and computer program products.

These and other embodiments can optionally include one or more of the following features: the search results include web search results; the first endorsement annotation includes text indicating the first user and a service used to generate the first endorsement; the first endorsement annotation comprises a link to the first endorsement; the first endorsement is generated using a computer-implemented service; the computer-implemented service includes at least one of a social networking service, a micro-blogging service, a blogging service and a web content hosting service; actions further include: receiving, at the computing device, an identifier associated with the user, and retrieving user profile data from a computer-readable storage device based on the identifier, the user profile date comprising a contact index; retrieving user profile data occurs in response to receiving the search query; the contact index provides a list of members of the social graph of the user; actions further include: determining that the first search result of the search results is associated with a second endorsement generated by a second user, determining that the second user is not a member of the social graph of the user, and transmitting instructions to display the search results to the user, the instructions including instructions to display the first search result without an endorsement annotation associated with the second endorsement; the first endorsement includes digital content shared by the first user; the digital content includes a link to a web document that is a subject of the first search result; and identified search results are each associated with at least one endorsement.

Aspects of the subject matter described in this specification can be embodied in methods that include the actions of receiving, at a computing device, a search query from a user, the search query being provided through a web search service, receiving, at the computing device, search results responsive to the search query, the search results each associated with digital content stored in one or more computer-readable storage media, determining that a first search result of the search results is associated with a first endorsement generated by a first user, the first endorsement having been generated using a computer-implemented service including one of a social networking service, a micro-blogging service, a blogging service and a web content hosting service, determining that the first user is a member of a social graph of the user, and transmitting instructions to display the search results to the user, the instructions including instructions to display a first endorsement annotation associated with the first search result, the first endorsement annotation indicating the computer-implemented service used to generate the first endorsement.

The details of one or more embodiments of the present disclosure are set forth in the accompanying drawings and the description below. Other features, aspects, and advantages of the present disclosure will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
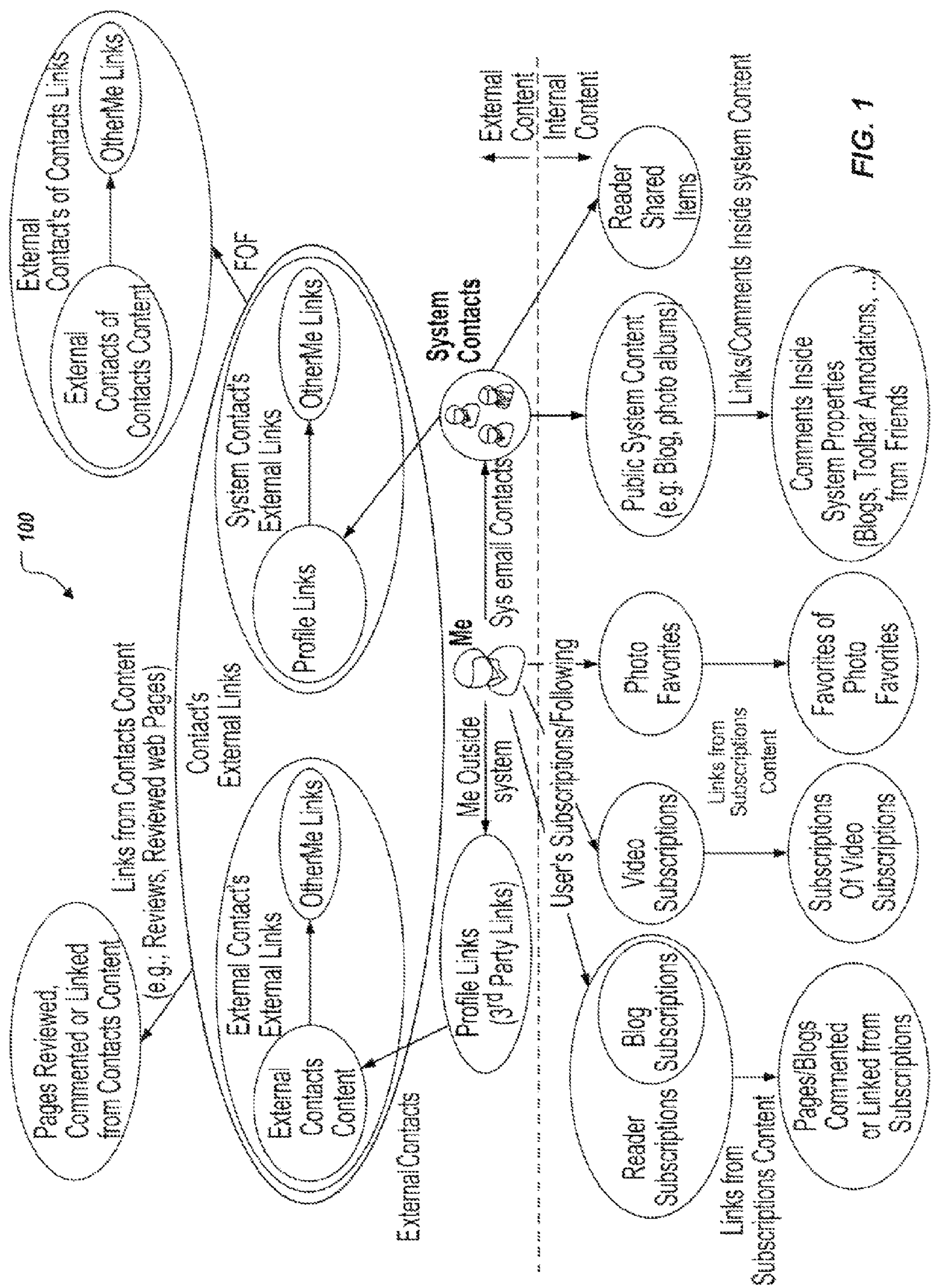
FIG. 1 is a diagram of example sources of social graph information.

Aspects of this specification are directed to retrieving and displaying endorsements in social search results. As used herein, the term endorsement can include one or more references that a user makes to online content and can include positive and negative references. In some examples, the online content can include and/or can be associated with web documents, entities, interests, people, places, things, electronic messages, images and/or any other type of content. In some examples, a user can like a document (and/or the content therein) and can associate a positive reference with the document. In some examples, a user can dislike a document (and/or the content therein) and can associate a negative reference therewith.

In some implementations, search results can be determined based on a search query provided by a searching user. It can be determined whether the search results include social search results. Social search results can include endorsements generated by one or more users. The one or more users can include members of the searching user's social graph. Endorsed search results can be annotated with an associated endorsement and can be displayed to the searching user in a search results page.

In some implementations, a web resource (e.g., a website, a web page and/or other web documents) and/or content within a web resource can be endorsed by users. In some examples, an author user can endorse a web page by embedding a link pointing to the web page with content authored by the author user. In some examples, an author user can endorse content provided within a web page by embedding a link pointing to the web page in content authored by the author user.

In some examples, the content generated by an author user can be generated within the context of a computer-implemented service (e.g., a blogging service, a micro-blogging service, product reviews, posts within a social networking service). For example, an author user can endorse a book by generating the example content "Great read: http://example.com" within content generated by the user in a computer-implemented service. For example, the author user can generate a micro-blog post that includes the example content using a micro-blogging service. As another example, the author user can generate a post that includes the example content using a social networking service.

In the example content "Great read: http://example.com," the destination web page of the link embedded in the content can be considered to be "publicly endorsed" by the author user. The content in this example provides a positive sentiment concerning the endorsed content (e.g., a recommendation to read the particular book identified by following the link). In some examples, endorsements provided by author users can carry a negative, or neutral sentiment (e.g., "Not a great read: http://example.com").

In some implementations, search results retrieved and presented by a search system in response to various text queries from a searching user can be influenced by endorsements. In some examples, search results can be annotated based on endorsements within a search results page.

In some implementations, author users associated with a particular searching user can be identified using a social graph of the searching user. As used in this specification, a social graph can refer to a single social graph or multiple interconnected social graphs. Distinct social graphs can be generated for different types of connections a user has. For example, a user can be connected with chat contacts in one social graph, electronic messaging contacts in a second social graph, and connections (or contacts) from a particular social networking service in a third social graph. Each social graph can include edges to additional individuals or entities at higher degrees of separation from the user. These contacts can in turn have additional contacts at another degree of separation from the user. Similarly, a user's connection to someone in a particular social network can then be used to identify additional connections based on that person's connections. The distinct social graphs can include edges connecting one or more social graph to one or more other social graphs.

Types of connections and social graphs can include, but are not limited to other users in which the user is in direct contact (e.g., user mail or chat contact, direct contacts on social sites) and users in which the user is in indirect contact (e.g., friends of friends, connections of users that have a direct connection to the user). In some implementations, the social graph includes content generated by individuals (e.g., blog posts, reviews) as connections to the user. The social graph can include connections within a single network or across multiple networks (separable or integrated). Public social graph relationships can also be considered. In some examples, public relationships can be established through public profiles and/or public social networking services.

FIG. 1 is a diagram 100 of example sources of social graph information. The user's social graph is a collection of connections (e.g., users, resources) identified as having a relationship to the user within a specified degree of separation. The user's social graph can include people and particular content at different degrees of separation. For example, the social graph of a user can include friends, friends of friends (e.g., as defined by a user, social graphing site, or other metric), the user's social circle, people followed by the user (e.g., subscribed blogs, feeds, or web sites), co-workers, and other specifically identified content of interest to the user (e.g., particular web sites).

Diagram 100 shows a user and example connections that extend a user's social graph to people and content both within a system and across one or more external networks and shown at different degrees of separation. For example, a user can have a profile or contacts list that includes a set of identified friends, a set of links to external resources (e.g., web pages), and subscriptions to content of the system (e.g., a system that provides various content and applications including electronic messaging, chat, video, photo albums, feeds, or blogs). Each of these groups can be connected to other users or resources at another degree of separation from the user. For example, the friends of the user each have their own profile that includes links to resources as well as friends of the respective friends. The connections to a user within a specified number of degrees of separation can be considered the social graph of the user. In some implementations, the number of degrees of separation used in determining the user's social graph can be specified by the user. In some implementations, a default number of degrees of separation is used. Moreover, a dynamic number of degrees of separation can be used that is based on, for example, the type of connection.

In some implementations, the membership and degree of separation in the social graph is based on other factors, including a frequency of interaction. For example, a frequency of interaction by the user (e.g., how often the user visits a particular social networking site) or type of interaction (e.g., endorsing or selecting items associated with friends). As interaction changes, the relationship of a particular contact in the social graph can also dynamically change. Thus, the social graph can be dynamic rather than static.

In some implementations, social signals can be layered over the social graph (e.g., using weighted edges or other weights between connections in the social graph). These signals, for example, frequency of interaction or type of interaction between the user and a particular connection, can then be used to weight particular connections in the social graph or social graphs without modifying the actual social graph connections. These weights can change as the interaction with the user changes.

In some implementations, social graphs can be stored using suitable data structures (e.g., list or matrix type data structures). Information describing any aspect of a stored social graph can be considered relationship data. For example, relationship data can include information describing how particular members of a user's social graph are connected to the user (e.g., through what social path is a particular entity connected to the user). Relationship data can also include information describing any relevant social signals incorporated in the user's social graph. In some implementations, relationship data can be stored in a relationship lookup table (e.g., a hash table). Suitable keys for locating values (e.g., relationship data) within the lookup table can include information describing the respective identities of both a user and any member of the user's social graph. For example, a suitable key for locating relationship data within the lookup table can be (User X, User Y), where User Y is a member of User X's social graph. In some implementations, the relationship lookup table can be accessed by a search system to rank search results or to generate annotations describing retrieved search results. For example, the lookup table can include text snippets describing respective social paths between a user and one or more members of the user's social graph.

Figure 2:
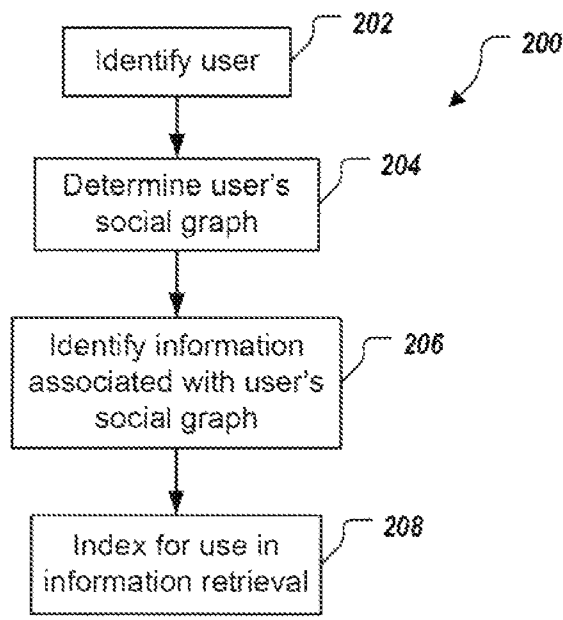
FIG. 2 is a flow diagram of an example method for using social graph information.

FIG. 2 is a flow diagram of an example method 200 for using social graph information. For convenience, the method 200 will be described with respect to a system, including one or more computing devices, that performs the method 200.

The system identifies a user (202). The user can be identified, for example, based on a user profile associated with the system. The user profile can be identified, for example, when the user logs into the system using a username, electronic messaging address, or other identifier.

The system determines the user's social graph (204). The user's social graph identifies people and resources associated with the user, for example, in which the user has indicated an interest. In some implementations, the social graph is limited to a specified number of degrees of separation from the user or particular relationships or types of interaction with the user. In some implementations, the user's social graph is generated by another system and provided upon request. In some examples, the user's social graph can be provided as an index that identifies each member of the user's social graph and indicates one or more services, through which the user and the member are connected (e.g., electronic messaging contacts, social networking contacts, etc.).

In some implementations, the user's social graph is determined using user profile data, as well as analyzing information from users and resources identified in the user profile data. For example, the user's profile can include a list of the user's friends. The user's friends can include friends within the system (e.g., using a same electronic messaging or chat service that is affiliated with the system) or external to the system (e.g., social graphs or a list of contacts associated with third party applications or service providers). The user's profile can also include a list of subscriptions to which the user belongs (e.g., identifying content that the user follows, for example, particular blogs or feeds).

The user's profile can also include external links identified by the user. These links can identify particular content of interest. In some implementations, the user's profile also identifies other aliases used by the user (e.g., as associated with particular content providers or social graph sources). For example, a user may have a first identity for a chat application and a second identity for a restaurant review web site. These two identities can be linked together in order to unify the content associated with that user.

The social graph can be further expanded by analyzing information from the identified people and content in the user's profile. For example, public profile information can exist for identified friends from which information can be analyzed (e.g., their friends, links, and subscriptions). In some implementations, the user can adjust the members of the social graph directly. For example, the user can group their contacts (e.g., electronic messaging contacts) into particular groups accessed by the system in building the user's social graph.

Similarly, a user can prevent the system from adding members to the user's social graph, for example, by an opt-out option or by keeping contacts out of the particular groups used by the system to generate the social graph. In some implementations, privacy features provide a user with an opt-in or opt-out option to allow or prevent, respectively, being included (or remove the user if already included) as a member of another's social graph. Thus, users can have control over what personal information or connection information, if any, is included in social graphs. Further, a user can prevent the system from analyzing information associated with the user's social graph. In some implementations, privacy features provide a user with an opt-in or opt-out option to allow or prevent, respectively, access to and/or analysis of information associated with the user's social graph.

The system can identify information associated with the user's social graph (206). The identified information associated with the user's social graph can include, for example, content or postings to web resources subscribed to by the user (e.g., particular blogs and/or microblogs). The identified information can also include content generated by members of the user's social graph. For example, members of a user's social graph can generate content including local reviews (e.g., for restaurants or services), video reviews and ratings, product reviews, book reviews, blog comments, news comments, maps, public web annotations, public documents, streaming updates, photos and photo albums.

In some implementations, the information identified by the system that is associated with the user's social graph can include endorsement information. For example, the system can determine endorsement data from content generated by the user and/or members of the user's social graph. Endorsement data can include one or more of several suitable types of information describing an endorsement. In some implementations, endorsement data can include information identifying an endorsed web resource. For example, such endorsement data can include a URL specifying a web address of the endorsed web resource. Endorsement data can also include an identity of the entity providing the endorsement (i.e., the endorser). For example, such endorsement data can include: a name, a screen name, an electronic message address, a profile identifier, etc. Endorsement data can also include other types of information, for example, a date/time stamp and/or a sentiment tag (e.g., positive, negative, neutral).

The system can index the identified information associated with the user's social graph for use in information retrieval (208). In some implementations, identified information associated with the user's social graph can be indexed by generating and incorporating suitable data structures, such as social restricts, in an existing search index. In some examples, the system can generate social restricts by mapping the identified information to corresponding web resources referenced in a search index and determining the social connection between the web resources and the user. For example, the system can access a relationship lookup table which includes relationship data describing a user's social graph to determine such social connections. In some examples, social restricts can be provided in the form of an information tag associated with a referenced web resource included in the search index.

In some implementations, an existing search index with references identifying several web resources can be searched in response to a received search query to identify relevant search results. In some implementations, the system can receive a query and identify both general search results as well as social search results (e.g., search results associated with the user's social graph) based on the indexed social restricts. For example, social restricts can facilitate retrieval of search results from the search index that are associated with members of a user's social graph. In some implementations, the search system can implement a lookup routine (e.g., a query text matching lookup routine) limited to a subset of the referenced web resources in the search index that are tagged with a specified social restrict.

In some examples, the system can tag a social restrict to any referenced web resources in the search index that has been authored by a searching user or any members of the social graph of the searching user. In this manner, the system can limit retrieval of search results to this subset of web resources by confining the search index lookup routine to web resources that have been tagged with the specified social restrict. In some examples, social restricts can concentrate searching of the index to web resources containing content authored by one or more specific types of social graph members (e.g., internal friends, external friends, friends-of-friends, new friends, etc.). In some implementations restricts marking endorsed web resources can also be provided and added to the index. In some implementations, indexed social graph information is periodically updated, for example, to include recently added information associated with the user's social graph.

As described above, a relationship lookup table can be utilized by a search system to generate annotations, for example, by accessing text snippets within the table that describe relationships between a user and a member of the user's social graph. In some examples, a similar data structure (e.g., an endorsement lookup table) for storing text snippets that describe endorsements can also be provided. The endorsement text snippets can be accessed by the system to generate annotations presented with retrieved search results that have been endorsed.

Figure 3:
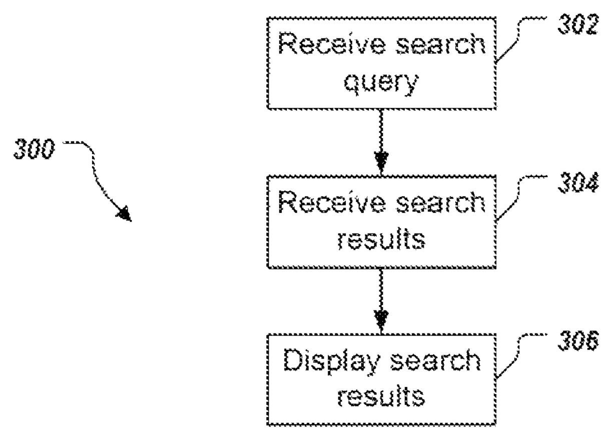
FIG. 3 is a flow diagram of an example method for presenting search results including social graph information.

FIG. 3 is a flow diagram of an example method 300 for retrieving and presenting search results including endorsement information. For convenience, the method 300 will be described with respect to a search system including one or more computing devices that performs the method 300.

The search system receives a search query from a user (302). For example, the user can input a search query into a search interface of a particular system. The search query includes one or more terms and can be general or directed to particular types of resources (e.g., a web search or an image search).

The user can submit the search query from a client device. The client can be a computer coupled to the search system through a local area network (LAN) or wide area network (WAN), e.g., the Internet. In some implementations, the search system and the client device is a single machine. For example, a user can install a desktop search application on the client device. The user can submit the search query to a search engine within the search system.

When the user submits the search query, the search query is transmitted through a network to the search system. The search system can be implemented as, for example, computer programs running on one or more computers in one or more locations that are coupled to each other through a network.

The search system retrieves search results including search results associated with the user's social graph (304). For example, the system can retrieve search results endorsed by one or more members of the user's social graph. In some implementations, the search system can include a search engine for retrieving search results relevant to the received query. The search engine can include an indexing engine that indexes resources (e.g., web documents such as web pages, images, or news articles on the Internet) found in a corpus (e.g., a collection or repository of content), a search index that stores the index information, and a document locator for identifying resources within the search index that are responsive to the query (for example, by implementing a query text matching routine).

In some implementations, the document locator can identify web documents within the search index that are relevant to the user. For example, the document locator can utilize social restricts tagged to referenced web resources within the search index to identify search results endorsed by one or more members of the user's social graph.

In some examples, the search engine can also include a ranking engine (or other software) to rank web resources that match the query. The indexing and/or ranking of the web resources can be performed using conventional techniques. In some implementations, the identified information associated with the user's social graph can be included in a same index as other resources or a separate index. Consequently, a separate search can be performed for general search results responsive to the query, as well as particular search results that identify resources associated with the user's social graph (e.g., endorsed web resources).

In some implementations, the presentation and ranking of search results associated with the user's social graph can be adjusted by one or more factors including one or more social signals. For example, affinity can be used to determine whether to show search results representing web resources endorsed by a particular member of the user's social graph or whether to promote or demote such web resources. Affinity identifies the closeness of a member to the user. For example, a friend of a friend who has five common middle friends with the user has a higher affinity than a friend of a friend who has only one common middle friend. Other factors in determining affinity can include: how a friend is connected to the user (e.g., the source of the connection), which social graphing site the friend is a member of, whether friend or friend of friend, and how many paths to get to the friend of a friend (e.g., common middle friends).

Affinity can also be based on the user's interactions with members of the social graph (e.g., frequency, type). For example, a user that frequently clicks on posts by a particular contact can have a higher affinity with that contact than the affinity with other contacts where they click on respective posts less frequently. Affinity can also be greater for particular types of interactions, for example, comments on contact's posts can result in higher affinity than occasional endorsements. In general, affinity can be affected by the weights of the corresponding social graph edges. Affinity can change over time. For example, as the types or frequency of interactions change with members of the social graph, the resulting affinity can change as well.

Ranking can also be effected based on other factors, for example, an information retrieval score of social graph content relative to the submitted query (e.g., relevance of the social graph content), content type (e.g., blogs versus images), and the date of the associated content.

Additionally, when interleaving search results associated with the user's social graph along with general search results, a promotion can be applied to the search results associated with the user's social graph in order to increase their visibility. For example, the ranking of search results endorsed by a friend of the user may be initially lower than a general wide-spread search result. Thus, promotion of the endorsed search result can help highlight an endorsed search result interleaved with other search results.

In some implementations, endorsements provided by members of the user's social graph can be used as social signals to adjust rankings of corresponding search results. For example, if a search query identifies search results that include a web resource that has been endorsed by a member of the user's social graph, this result can be boosted relative to other general search results responsive to the user's query. The boosting factor could be based on, for example, the number of friends who endorsed the identified resource or a top affinity to a friend who endorsed the identified resource. Boosting can also be based on authorship (e.g., what is the relationship or affinity with the individual that endorsed the resource), or the type of endorsement provided by the member of the user's social graph (e.g., an explicit endorsement by starring a result or page or an implicit endorsement by visiting the resource or commenting on a posting). In some implementations, a sentiment carried by an endorsement can be used for to adjust a boosting factor. For example, web content that has been positively endorsed can be boosted relative to general web content and/or to web content that has been negatively or neutrally endorsed. As another example, negatively endorsed web content could be demoted relative to general web content and/or to web content that has been positively or neutrally endorsed.

The system presents one or more of search results including search results associated with the user's social graph (306). For example, the search system can present search results representing web resources endorsed by one or more members of the user's social graph. In some implementations, the search engine can transmit retrieved search results through the network to the client device for presentation to the user, for example, as a search results web page to be displayed in a web browser running on the client device. In some implementations, the search system presents responsive search results associated with the user's social graph together in a cluster, separate from any general search results. In some embodiments, the system presents search results associated with the user's social graph intermixed with any retrieved general search results.

In some implementations, the search system can present search results with annotations describing the web resource represented by each retrieved result. In some implementations, search results representing web resources that have been endorsed by one or more members of the user's social graph can be presented with multiple annotations. For example, such search results can include a resource descriptive annotation describing the content of the represented web resource, which can be generating according to conventional methods, and an endorsement descriptive annotation describing the endorsement.

In some examples, suitable annotations can be generated from indexed text snippets accessible by the search system. For example, in generating an endorsement descriptive annotation for a search result, the search engine can access a relationship lookup table to retrieve text snippets describing the social relationship between the user and a particular member of the user's social graph that provided the endorsement. The search engine can also access an endorsement lookup table including endorsement data to retrieve text snippets describing the endorsement of the responsive search result (e.g., when and/or where the endorsement occurred).

Figure 4:
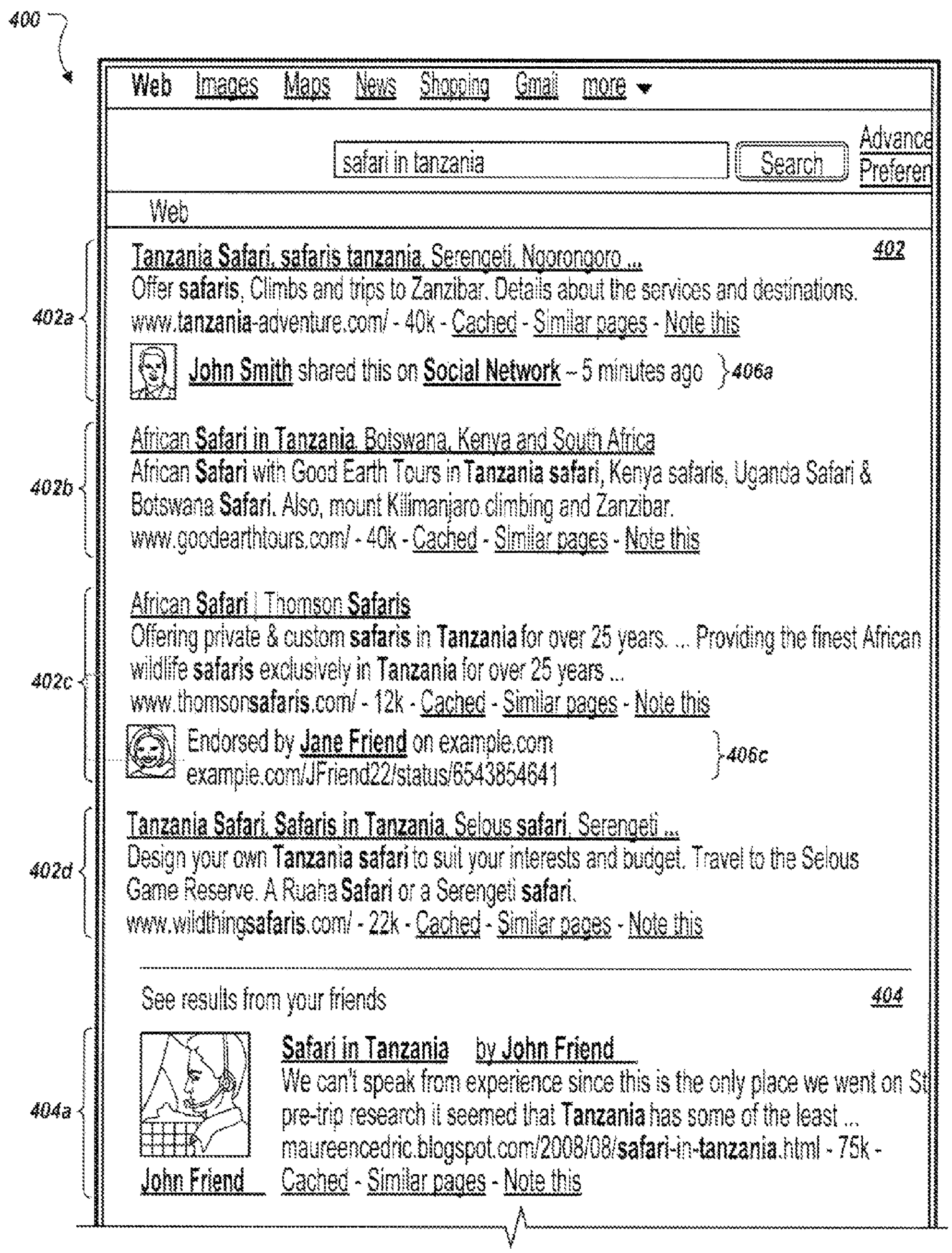
FIG. 4 is a representation of an example search results page including search results associated with the user's social graph as well as separately presented results from the user's social graph.

FIG. 4 is a representation of an example search results page 400 that includes results associated with the user's social graph as well as separately presented results from the user's social graph. The search results page 400 displays example search results responsive to the example query "safari in Tanzania." In the depicted example, the displayed search results include web results 402, as well as results from the user's social graph 404. The web results 402 include search results 402*a*, 402*b*, 402*c*, 402*d*. The search results 402*a*, 402*c* include respective social annotations 406*a*, 406*c*. For example, the social annotation 406*a* indicates that the associated search result was shared by a member of the user's social graph (e.g., the social graph of the user that entered the search query) using a service. In the depicted example, "John Smith" is a member of the user's social graph and shared the search result 402*a* using a social networking service "Social Network." The social annotation 406*c* indicates that the associated search result was endorsed by a member of the user's social graph using a service.

In the depicted example, "Jane Friend" is a member of the user's social graph and shared the search result 402*c* using a micro-blogging service "example.com." In the depicted example, a thumbnail image corresponding to the member of the user's social graph is provided in the social annotations. The social annotation 406*c* indicates that the contact Jane Friend endorsed the particular search result and indicates the service used to generate and/or publish the endorsement. The social annotation 406*c* further provides a link (URL) that can be used to direct the searching user to the endorsement within the service.

The results from friends 404 includes responsive search results associated with a social graph of the user. For example, the results from the user's social graph 404 includes blog postings, video, and photos from people in the user's social graph. Additionally, in some implementations, a representation of the friend is also presented with the search result (e.g., a picture and name of the friend). In some implementations, selecting the particular name of the friend filters the search results based on the friend. In the depicted example, the results from friends 404 include results 404*a*, 404*b*, 404*c*, 404*d*. The results 404*b* correspond to the member "Jane Friend," who endorsed the website provided in the search results 402*c*. The results 404*c* correspond to the member "John Smith," who shared the search results 402*a*.

In some implementations, search result annotations reflecting endorsements can include a simplified annotation. In some examples, a simplified annotation can include an identification of the endorsing user (endorser) and the service used to generate and/or publish the endorsement. In the example search results of FIG. 4, a simplified annotation can include:

Endorsed by Jane Friend—connected via example.com

In some implementations, search result annotations reflecting endorsements can include a more complex annotation. In some examples, a more complex annotation can include an identification of the endorsing user (endorser), the service used to generate the endorsement and a link to the endorsement on the service. In the example of FIG. 4, a more complex annotation includes the depicted annotation:

Endorsed by Jane Friend on example.com
example.com/JFriend22/status/6543854641

In some implementations, endorsements can be provided as a social relationship. For example, an endorser-endorsee social relationship type can be provided to define at least part of a social relationship between users. Endorsement data can be identified from a search corpus (e.g., digital content that is available to be searched) and can be combined with internal and external social graph information to establish endorsement relationships. For example, endorser-endorsee relationships can capture, for each searcher X and document A, one or more endorsers Y, through which X is/are socially interested in A. In some examples, the relationships can be used to generate an endorsement index (table) with endorsement annotations. The endorsement index can be used by a service that retrieves connection information from the endorsement index.

In some implementations, rich snippets that make up the endorsement can be provided. In some examples, rich snippets can be content rich and can include both content from the endorsement itself and content from the subject (e.g., web document) being endorsed. In some implementations, the endorser-endorsee social relationship type is provided and endorsement data can be identified from a search corpus (i.e., digital content that is available to be searched) and can be combined with internal and external social graph information to establish endorsement relationships. In some examples, a restrict type and an attachment are introduced for endorsements. The attachment can include a list of pairs (content corpus, document identifier), one for each endorsement of the document. In some implementations, the attachment can be encrypted to accommodate for secure results. The restrict can include an attribute that is an index within the endorsement list in the attachment. Connection data about the endorser can be stored. Further, a retrieval path can be provided that issues requests and fetches snippets for endorsements associated with retrieved search results.

In some examples, endorsements can be streamed to the search result page after the initial search results page was sent and displayed. In some examples, a user interface can include later received endorsements in a hover card and/or an expandable section.

In some implementations, fresh endorsements are accounted for. In some examples, fresh endorsements can include endorsements provided within a recent timeframe (e.g., within the past X hours). For fresh endorsements, the index restricts or connection information might not be present. For handling fresh endorsements, multiple approaches can be provided. A first example approach can include attempting the retrieval of the fresh endorsed documents, and a second example approach can include improvement of the retrieval of the endorsing services.

In the first example approach, existing system components can be leveraged by treating endorsements as quick endorsements. In some examples, a quick endorsement can be generated by a user clicking on an endorsement object associated with digital content. By way of non-limiting example, a share button can be displayed adjacent to and can be associated with particular digital content. When a user activates the share button (e.g., clicks on), a quick endorsement is generated such that the digital content is shared by the user with members of the users social graph. In this manner, the user that activated the share button can be considered as an author of the quick endorsement.

For retrieving freshly endorsed content, existing system components for retrieving quick endorsements can be used. In some examples, a batch process can be provided for writing correct endorsement annotation data for existing endorsements. Endorsement annotations can be retrieved for a top number of search results (e.g., top 200 search results).

As discussed herein, and in some implementations, social restricts can be immediately attached to fresh endorsements that appear in social search. The snippets of retrieved content with endorsements already include the title of the endorsed document. However, the retrieval is not based on the endorsed document content, that is, the query is not matched against any part of the content. Consequently, fresh endorsements can be accounted for in social search by improving the retrieval of fresh content.

Accordingly, in the second example approach, the title of the endorsed document and/or some of its content can be stored along with the endorsement. The stored data can be used in retrieving the fresh endorsement. In some examples, some of the endorsed document content (e.g., title, query-independent snippet) can be indexed. Retrieval can be extended to the indexed endorsed document content.

As discussed above, an endorsement index can be provided. In some implementations, the endorsement index includes information about endorsed content that can be used to annotate search results. In some examples, the endorsement index can be generated in a sequence of phases. Example phases can include an endorsement identification phase, an endorser phase and an endorsement index generation phase. In the endorsement identification phase, content generated by users (potential endorsements) can be processed to identify actual endorsements and to match endorsed URLs against web corpora. In some examples, web corpora can include one or more indexes that each index digital content accessible over a network (e.g., the Internet). The endorsement identification phase results in an initial table that maps each endorsed and indexed URL (URL A) to an endorsed document information message that includes all of the endorsements for the URL A.

In some implementations, the endorsement index includes a plurality of entry types. Example entry types include searcher, endorsement and default endorsement. In some examples, searcher entries describe the connection between a searcher X and an endorsed (target) document A. In particular, searcher entries map (X, A) to one or more social graph nodes of the endorsers Y1, . . . Yn, all of whom endorsed A and are in the social circle of X. In some examples, there might only one such endorser Y. In some examples, the searcher entries might only include a subset of all the endorsers Y1, . . . , Yn, for instance, only one of them. The subset can be selected in a variety of ways. In some implementations, the subset can include the most recent endorsers only. For instance, all endorsers who endorsed A more recently than a fixed or dynamically set date; or up to N endorsers who endorsed A most recently, where N is a fixed or dynamically determined list size. In some implementations, the subset can include randomly selected endorsers, or those endorsers with the highest affinity with A. In some examples, endorsement entries establish the connection between an endorser Y and an endorsed (target) document A. In particular, endorsement entries map (Y, A) to associated endorsement information. Example endorsement information include the URL and timestamp of the latest (source) endorsement B, so that endorser Y authored endorsement B and endorsement B includes a link to document A. In some implementations, the endorsement information for (Y, A) can contain the details of multiple endorsements, that can be selected in a multitude of ways. For example, multiple most recent endorsements can be selected, or a subset of endorsements can be selected at random from a larger pool of endorsements. In some examples, default endorsement entries, discussed in further detail below, establish the connection between the default (or primary) endorser Z and an endorsed document A. In some examples, default endorsement entries map document A to the endorsement information. If, for some searcher X, the searcher entry (X, A) is missing from the endorsement index, it is assumed that X is connected to A through Z, and the default endorser entry contains the corresponding endorsement information.

Default endorsements provide an optimization for an endorser with a large number of searchers. By way of non-limiting example, an endorser X and an endorser Y both endorse a document A, 30 searchers S(X) are interested in endorser X (e.g., have a social connection to endorser X), and 20 searchers S(Y) are interested in endorser Y. Using searcher and endorsement entries only, the associated endorsement table includes the following example data (52 entries):

30 searcher entries (A, s) mapping to X for all s in S(X), 1 endorsement entry (A, X) mapping to the endorsement info for X, 20 searcher entries (A, t) mapping to Y for all t in S(Y), and 1 endorsement entry (A, Y) mapping to the endorsement info for Y.

In some examples, however, the most common, or default endorser can be factored out. Continuing with the example above, the endorser X can be considered to be the default endorser. By factoring out the endorser X, the associated endorsement table includes the following example data (22 entries):

1 default endorsement entry for A mapping to the endorsement info for X, 20 searcher entries (A, t) mapping to Y for all t in S(Y), and 1 endorsement entry (A, Y) mapping to the endorsement info for Y.

Whenever a particular searcher is among S(X), the pertinent endorsement information is in the default endorsement entry (as opposed to a combination of searcher and endorsement entries). For a particular searcher in S(Y), the endorsement information is still encoded in a combination of entries. In this manner, the correct retrieval of endorsement information is maintained in the presence of default endorsement entries.

Figure 5:
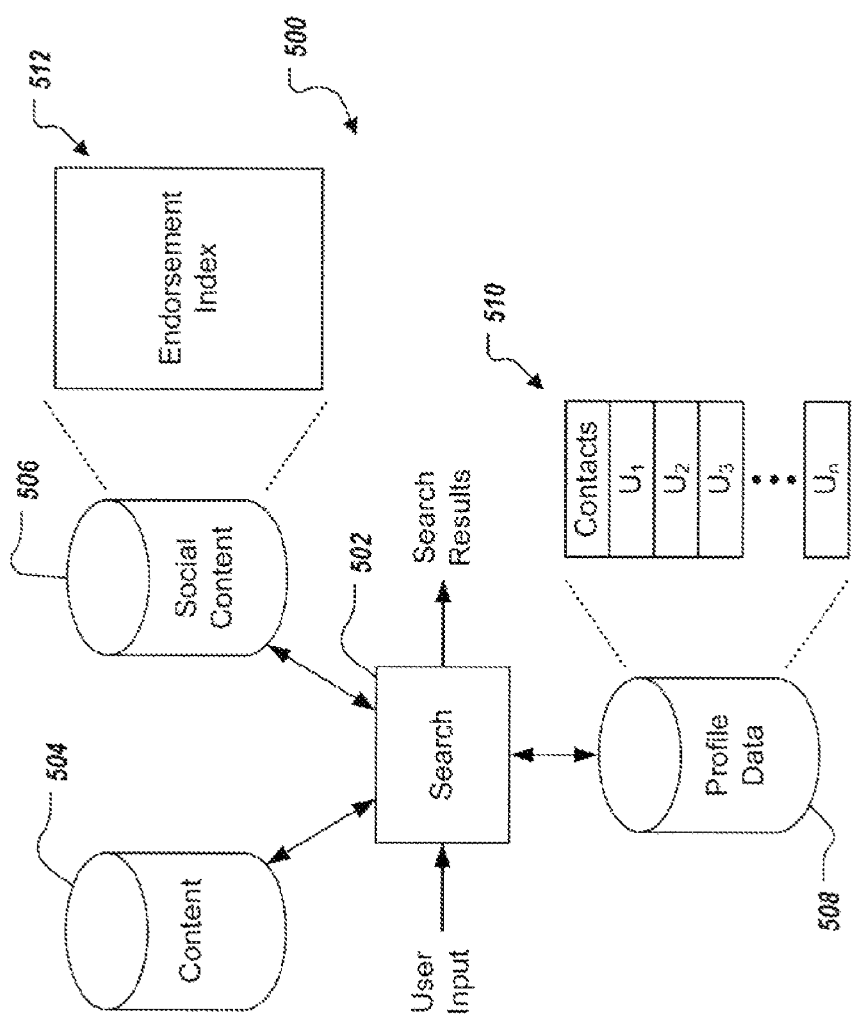
FIG. 5 depicts example components that can be used to provide endorsements in search results based on a user's social graph.

FIG. 5 depicts example components that can be used to provide endorsements in search results based on a user's social graph. The example components include a search component 502, a content data source 504, a social content data source 506 and a profile data source 508. In some examples, the search component 502 can be provided as one or more computer programs executed using on or more computing devices (e.g., servers). In some examples, each of the data sources 504, 506, 508 can be provided as one or more computer-readable storage devices (e.g., databases). The search component 502 can communicate with each of the data sources 504, 506, 508 via a network (e.g., a local area network (LAN) or wide area network (WAN), the Internet). The search component 502 receives user input, processes the user input based on data of provided from the data sources 504, 506, 508 and generates search results. The user input can be provided via a computing device (e.g., a client computing device) and the search results can be provided to the computing device for display to the user.

In some examples, the user input can include user log-in information (e.g., username and password) that can be used to log the user into a search service provided by the search component 502. The search component 502 can identify a user profile based on the user input and can retrieve profile data corresponding to the user from the profile data source 508. In some examples, the user profile data can include a contact index 510. The contact index 510 can be used to identify members of the user's social graph. For example, the user's social graph can include user's $U_1, \ldots U_n$. In some examples, the social content data source can include an endorsement index 512. The endorsement index 512 can be used to identify endorsement annotations that can be provided in search results. In the depicted example, one or more endorsements corresponding to a contact (i.e., an endorser) and one or more documents (e.g., web pages) are identified.

The user input can include a search query that is received by the search component 502. In response to receiving the search query, the search component 502 can process data provided by the content data source 504 and the social content data source 506 to generate search results. In some examples, in response to receiving the search query, the search component 502 can retrieve the contact index 510 corresponding to the user that provided the search query (e.g., based on the user's log-in information). The search component 502 can access the endorsement index 512 to retrieve endorsements that may be relevant to the search results. In some examples, one or more pairs can be provided as input to the endorsement index 512. Each pair can include a searching user, search result pair.

By way of non-limiting example, a searcher X can submit a search query that generates search results that include documents A, B, C. The pairs (X, A), (X, B), (X, C) can be provided as input to the endorsement index 512, which attempts to map (X, A), (X, B), (X, C) to an endorser Y, who is in the social graph of the searcher X. For purposes of illustration, A and C are endorsed by the endorser Y. Pairs (Y, A) and (Y, C) are provided as inputs and endorsement data is retrieved. The endorsement data can include the URLs of the respective documents A, C and timestamp of the latest (source) endorsements Q, R, so that Y authored Q and R, where Q includes a link to A and R includes a link to C.

Figure 6:
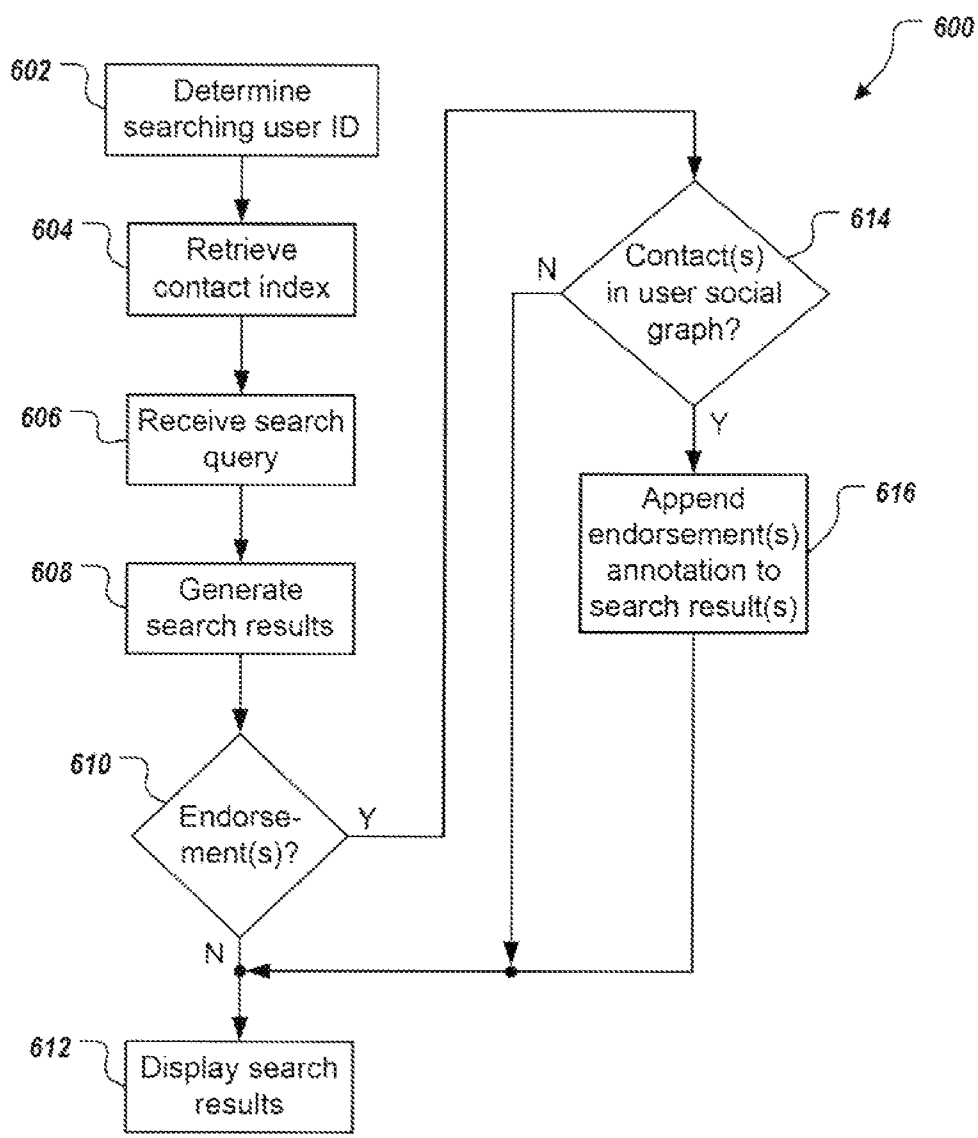
FIG. 6 is a flow diagram of an example process that can be executed in implementations of the present disclosure.

FIG. 6 is a flow diagram of an example process 600 that can be executed in implementations of the present disclosure. For convenience, the example process 600 will be described with respect to a system including one or more computing devices that performs the example process 600.

The ID of a searching user is determined (602). In some examples, the ID of the searching user (i.e., the user that is performing a search) can be determined based on user log-in information (e.g., username and password). A search query is received (604). A contact index corresponding to the searching user ID is retrieved (606). Search results are generated (608).

It is determined whether the search results include search results associated with one or more endorsements (610). If the search results do not include search results associated with one or more endorsements, the search results are displayed (612). If the search results include search results associated with one or more endorsements, for each endorsement, it is determined whether the endorsement was authored by a contact in the social graph of the searching user (614). If the endorsement was not authored by a contact in the social graph of the searching user, the search results are displayed (612). If the endorsement was authored by a contact in the social graph of the searching user, an endorsement annotation is appended to the associated search result (614). The search results, with appended endorsement annotation(s) are displayed (612).

Implementations of the present disclosure and all of the functional operations described in this specification can be implemented in digital electronic circuitry, or in computer software, firmware, or hardware, including the structures disclosed in this specification and their structural equivalents, or in combinations of one or more of them. Embodiments of the present disclosure can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the present disclosure can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the present disclosure, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the present disclosure or of what may be claimed, but rather as descriptions of features specific to particular embodiments of the present disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the present disclosure have been described. Other embodiments are within the scope of the following claims. For example, the actions recited in the claims can be performed in a different order and still achieve desirable results.

What is claimed is:

1. A computer-implemented method, comprising:

receiving, at a computing device, a search query from a first user, the first user associated with a computer-implemented social graph that includes a plurality of members socially connected to the first user through the computer-implemented social graph;

receiving, at the computing device, search results responsive to the search query, the search results each associated with a respective electronic document stored in one or more computer-readable storage media;

determining that a particular electronic document is associated with a plurality of endorsements;

identifying a subset of members of the plurality of members socially connected to the first user through the computer-implemented social graph, each member of the subset of members respectively associated with an endorsement of the plurality of endorsements;

identifying an affinity of each member of the subset of the members with respect to the particular electronic document;

selecting a subset of the plurality of endorsements based on the affinity of each member of the subset of the members with respect to the particular electronic document; and transmitting instructions to display the search results to the first user, the instructions comprising instructions to display one or more endorsement annotations associated with the subset of the plurality of endorsements proximate to the search result associated with the particular electronic document, the one or more endorsement annotations each including a text snippet describing the endorsement associated with the endorsement annotation, the text snippet including i) an identification of the respective member of the subset of members, ii) text indicating a service used by the respective member of the subset of members to generate the endorsement, and iii) a web-based link associated with the endorsement to direct the first user to the content of the endorsement within the service, wherein the text indicating the service used by the respective member of the subset of members to generate the endorsement is distinct from the web-based link.

2. The method of claim 1, wherein the endorsement annotations each further comprise a thumbnail image of the respective other user.

3. The method of claim 1, further comprising:

receiving, at the computing device, a selection of a link associated with the identification of one of the other users; and filtering the search results to include a subset of the search results based on the selected other user.

4. The method of claim 1, wherein the search results comprise web search results.

5. The method of claim 1, further comprising:

determining that the search result of the search results is associated with an additional endorsement generated by an additional other user;

determining that the additional other user is not a member of the social graph of the first user; and transmitting instructions to display the search results to the first user, the instructions comprising instructions to display the search result without an endorsement annotation that is associated with the additional endorsement.

6. A non-transitory computer storage medium encoded with a computer program, the program comprising instructions that when executed by one or more computers cause the one or more computers to perform operations comprising:

receiving, at a computing device, a search query from a first user, the first user associated with a computer-implemented social graph that includes a plurality of members socially connected to the first user through the computer-implemented social graph;

receiving, at the computing device, search results responsive to the search query, the search results each associated with a respective electronic document stored in one or more computer-readable storage media;

determining that a particular electronic document is associated with a plurality of endorsements;

identifying a subset of members of the plurality of members socially connected to the first user through the computer-implemented social graph, each member of the subset of members respectively associated with an endorsement of the plurality of endorsements;

identifying an affinity of each member of the subset of the members with respect to the particular electronic document;

selecting a subset of the plurality of endorsements based on the affinity of each member of the subset of the members with respect to the particular electronic document; and transmitting instructions to display the search results to the first user, the instructions comprising instructions to display one or more endorsement annotations associated with the subset of the plurality of endorsements proximate to the search result associated with the particular electronic document, the one or more endorsement annotations each including a text snippet describing the endorsement associated with the endorsement annotation, the text snippet including i) an identification of the respective member of the subset of members, ii) text indicating a service used by the respective member of the subset of members to generate the endorsement, and iii) a web-based link associated with the endorsement to direct the first user to the content of the endorsement within the service, wherein the text indicating the service used by the respective member of the subset of members to generate the endorsement is distinct from the web-based link.

7. The computer storage medium of claim 6, wherein the endorsement annotations each further comprise a thumbnail image of the second user.

8. The computer storage medium of claim 6, the operations further comprising:

receiving, at the computing device, a selection of a link associated with the identification of one of the other users; and filtering the search results to include a subset of the search results based on the selected other user.

9. The computer storage medium of claim 6, wherein the search results comprise web search results.

10. The computer storage medium of claim 6, the operations further comprising:

determining that the search result of the search results is associated with an additional endorsement generated by an additional other user;

determining that the additional other user is not a member of the social graph of the first user; and transmitting instructions to display the search results to the first user, the instructions comprising instructions to display the search result without an endorsement annotation that is associated with the additional endorsement.

11. A system, comprising:

one or more computers; and a computer-readable medium coupled to the one or more computers having instructions stored thereon which, when executed by the one or more computers, cause the one or more computers to perform operations comprising:

receiving, at a computing device, a search query from a first user, the first user associated with a computer-implemented social graph that includes a plurality of members socially connected to the first user through the computer-implemented social graph;

receiving, at the computing device, search results responsive to the search query, the search results each associated with a respective electronic document stored in one or more computer-readable storage media;

determining that a particular electronic document is associated with a plurality of endorsements;

identifying a subset of members of the plurality of members socially connected to the first user through the computer-implemented social graph, each member of the subset of members respectively associated with an endorsement of the plurality of endorsements;

identifying an affinity of each member of the subset of the members with respect to the particular electronic document;

selecting a subset of the plurality of endorsements based on the affinity of each member of the subset of the members with respect to the particular electronic document; and transmitting instructions to display the search results to the first user, the instructions comprising instructions to display one or more endorsement annotations associated with the subset of the plurality of endorsements proximate to the search result associated with the particular electronic document, the one or more endorsement annotations each including a text snippet describing the endorsement associated with the endorsement annotation, the text snippet including i) an identification of the respective member of the subset of members, ii) text indicating a service used by the respective member of the subset of members to generate the endorsement, and iii) a web-based link associated with the endorsement to direct the first user to the content of the endorsement within the service, wherein the text indicating the service used by the respective member of the subset of members to generate the endorsement is distinct from the web-based link.

12. The system of claim 11, wherein the endorsement annotations each further comprise a thumbnail image of the respective other user.

13. The system of claim 11, the operations further comprising:

receiving, at the computing device, a selection of a link associated with the identification of one of the other users; and filtering the search results to include a subset of search results based on the selected other user.

14. The system of claim 11, wherein the search results comprise web search results.

15. The system of claim 11, the operations further comprising:

determining that the search result of the search results is associated with an additional endorsement generated by an additional other user;

determining that the additional other user is not a member of the social graph of the first user; and transmitting instructions to display the search results to the first user, the instructions comprising instructions to display the search result without an endorsement annotation that is associated with the additional endorsement.

16. The method of claim 1, wherein the electronic document includes a web document.

* * * * *